J. G. MERCHEN.
Horse-Power Attachment.

No. 159,340.  Patented Feb. 2, 1875.

WITNESSES:  
A. W. Almqvist  
A. F. Terry

INVENTOR:  
John G. Merchen  
BY  
ATTORNEYS.

UNITED STATES PATENT OFFICE.

JOHN GEORGE MERCHEN, OF LOWDEN, IOWA.

IMPROVEMENT IN HORSE-POWER ATTACHMENTS.

Specification forming part of Letters Patent No. 159,340, dated February 2, 1875; application filed December 19, 1874.

*To all whom it may concern:*

Figure 1:
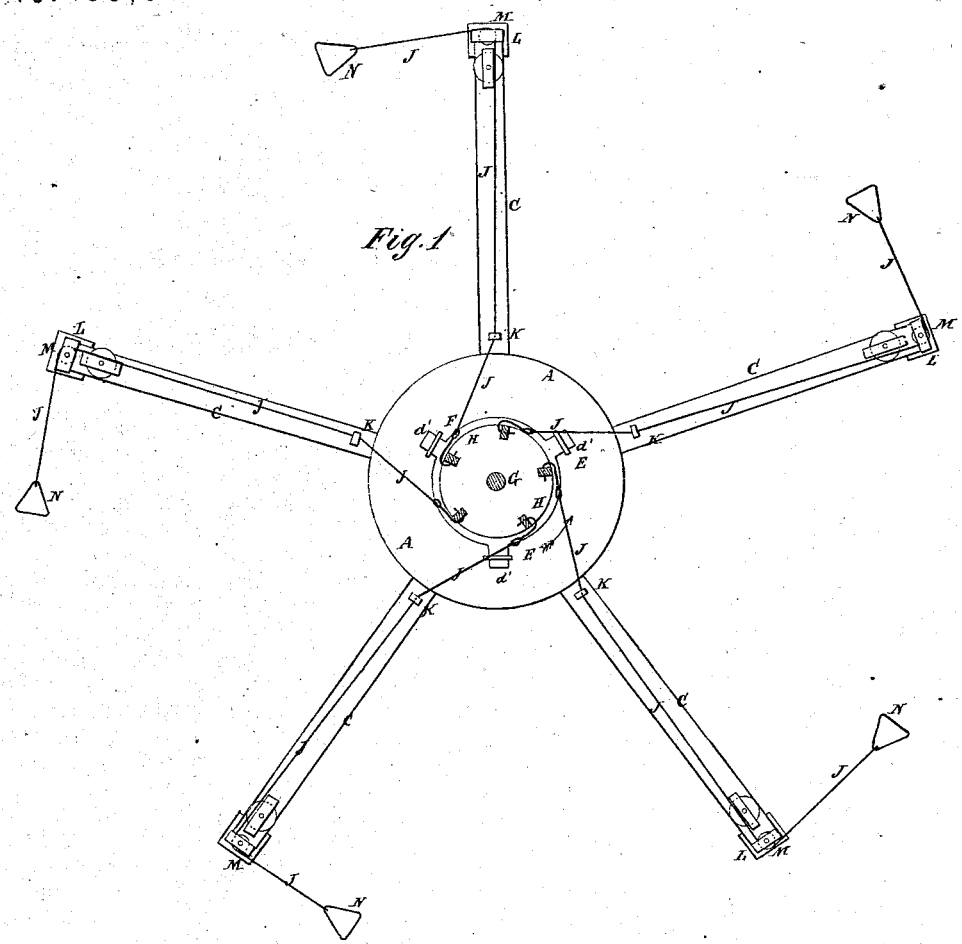
Figure 2:
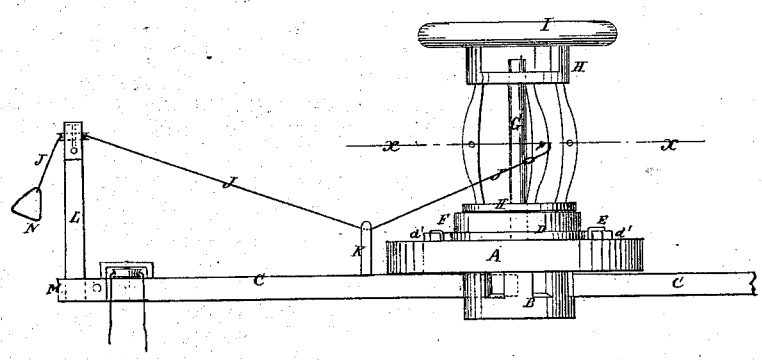

Be it known that I, JOHN GEORGE MERCHEN, of Lowden, in the county of Cedar and State of Iowa, have invented a new and useful Improvement in Device for Controlling Horses Attached to Horse-Powers, of which the following is a specification:

Figure 1 is a top view of a horse-power to which my improved device has been applied, partly in section through the line $x\ x$, Fig. 2. Fig. 2 is a side view of the same.

Similar letters of reference indicate corresponding parts.

My invention has for its object to furnish an improved device for attachments to horse-powers to enable the horses to be readily controlled.

The invention consists in the combination of the detachable base, the spindle, the skeleton-drum, the cords, and the studs, with the platform and the sweeps of a horse-power, as hereinafter fully described.

A represents the platform or power-wheel, from which motion is communicated to the machinery to be driven in the ordinary way. To the under side of the platform A is attached a casting, B, in which are formed sockets to receive the inner ends of the levers or sweeps C, to which the horses are attached. Upon the upper side of the platform A is placed a casting, D, which is made with three lugs, $d'$, two of which are passed through staples E, permanently attached to the platform A, and the third is secured by a hook-bolt, F, the shank of which is passed through the platform A, and has a hand-nut screwed upon its lower end, so that the casting D can be readily detached by removing the hook-bolt F. To the casting D is attached a spindle, G, upon which is placed a skeleton cylinder or drum, H, the lower end of which rests upon the base casting D, and to its upper end is attached a hand-wheel, I, for convenience in operating it. The skeleton-drum H is provided with a pawl to take hold of ratchet-teeth formed upon the base D to hold the said drum securely in any position into which it may be turned.

In the upright bars of the drum H are formed holes to receive the ends of the cords J, or hooks attached to said cords. The cords J pass through guide-eyes formed in or around pulleys pivoted to the upper ends of short studs K, attached to the sweeps C near the edge of the platform A. From the upper ends of the studs K the cords J pass around guide-pulleys pivoted to the upper ends of the studs L, which are made higher than the studs K, and the lower ends of which are inserted in sockets in castings M attached to the outer ends of the sweeps C. To the outer ends of the cords J are attached triangular or other shaped rings or loops N, to which the horse-reins are designed to be attached. The studs K L support the cords J and the reins at such a height as to be out of the way of the double-trees and whiffletrees, and so as to prevent the horses from getting their feet over said cords or reins.

By this construction, should an accident happen, the driver, by turning the drum H, draws all the reins taut at the same time, and is thus able to readily control all the horses.

Having thus described my invention, I claim as new, and desire to secure by Letters Patent—

The combination of the detachable base D, the spindle G, the skeleton-drum H, the cords J, and the studs K L, with the platform and sweeps of a horse-power, substantially as herein shown and described.

JOHN G. MERCHEN.

Witnesses:
  I. F. MERCHEN,
  ADOLPHUS REIMERS.